United States Patent
Binek et al.

(10) Patent No.: US 12,234,986 B2
(45) Date of Patent: Feb. 25, 2025

(54) ARTICLE AND METHOD FOR MANUFACTURING AN EXPANDED COMBUSTOR LINER

(71) Applicant: Raytheon Technologies Corporation, Farmington, CT (US)

(72) Inventors: Lawrence A. Binek, Glastonbury, CT (US); Jesse R. Boyer, Middletown, CT (US)

(73) Assignee: RTX CORPORATION, Farmington, CT (US)

( * ) Notice: Subject to any disclaimer, the term of this patent is extended or adjusted under 35 U.S.C. 154(b) by 562 days.

(21) Appl. No.: 16/930,797

(22) Filed: Jul. 16, 2020

(65) Prior Publication Data
US 2022/0018541 A1  Jan. 20, 2022

(51) Int. Cl.
*F02C 3/14* (2006.01)
*F23R 3/00* (2006.01)

(52) U.S. Cl.
CPC ............ *F23R 3/002* (2013.01); *F02C 3/14* (2013.01); *F23R 2900/00* (2013.01); *F23R 2900/00017* (2013.01); *F23R 2900/00018* (2013.01)

(58) Field of Classification Search
CPC .. F23R 2900/00017; F23R 2900/00018; F23R 2900/00; F23R 2900/00012; F23R 2900/00019; F23R 3/002; F02C 3/14
See application file for complete search history.

(56) References Cited

U.S. PATENT DOCUMENTS

| | | | | |
|---|---|---|---|---|
| 2,610,467 A | * | 9/1952 | Miller | F23R 3/08 60/757 |
| 3,698,743 A | * | 10/1972 | Sweet | F23R 3/08 285/187 |
| 3,702,058 A | * | 11/1972 | De Corso | F23R 3/08 60/757 |
| 4,852,355 A | * | 8/1989 | Kenworthy | F23R 3/02 415/115 |

(Continued)

FOREIGN PATENT DOCUMENTS

JP    S5585822 A    6/1980

OTHER PUBLICATIONS

United Kingdom Search Report for EP Application No. GB2110253.8, Dated Nov. 16, 2021, pp. 6.

(Continued)

*Primary Examiner* — Arun Goyal
(74) *Attorney, Agent, or Firm* — Getz Balich LLC (57) ABSTRACT

A method of manufacturing a nested combustor liner includes manufacturing a nested combustor liner into a green state including a plurality of annular interior walls radially adjacent to one another and circumferentially surrounding an exhaust duct aperture and a plurality of annular exterior walls radially adjacent to one another and radially spaced apart from and circumferentially surrounding the plurality of annular interior walls and an ignitor wall attached to a first annular interior wall at a first interior end, extending radially toward and attached to a first annular exterior wall at a first exterior end. The method includes assembling the plurality of annular interior walls and the plurality of annular exterior walls, forming an assembled combustor liner. The method includes densifying the assembled combustor liner.

12 Claims, 3 Drawing Sheets

(56) References Cited

U.S. PATENT DOCUMENTS

| | | | |
|---|---|---|---|
| 5,279,127 A | | 1/1994 | Napoli |
| 5,436,042 A | * | 7/1995 | Lau .................. C04B 35/62884 |
| | | | 428/221 |
| 6,047,539 A | * | 4/2000 | Farmer .................. F23R 3/002 |
| | | | 60/753 |
| 7,243,426 B2 | | 7/2007 | Schreiber et al. |
| 2010/0069226 A1 | * | 3/2010 | Meschter ............ C04B 35/6306 |
| | | | 501/134 |
| 2016/0169522 A1 | | 6/2016 | Cunha |
| 2016/0201914 A1 | * | 7/2016 | Drake ...................... F02C 7/28 |
| | | | 60/755 |
| 2016/0281986 A1 | * | 9/2016 | Chang .................... F23R 3/007 |
| 2018/0017258 A1 | * | 1/2018 | Stieg ...................... F23R 3/286 |
| 2019/0247921 A1 | * | 8/2019 | Godfrey .................. B22F 3/15 |

OTHER PUBLICATIONS

GB Combined Search and Examination Report for GB 2410230.3 dated Sep. 26, 2024.

* cited by examiner

ARTICLE AND METHOD FOR MANUFACTURING AN EXPANDED COMBUSTOR LINER

BACKGROUND

The present disclosure relates generally to gas turbine engines. More specifically, this disclosure relates to manufacturing of a combustor liner of a gas turbine engine.

Aircraft with gas turbine engines can include, for example, Unpiloted (or Unmanned) Aerial Vehicles (UAVs) and expendable turbojet systems for guided munitions, missiles, and decoys. These aircraft are generally designed as limited lifetime vehicles, with expected lifetimes as short as a single use or single mission vehicle. As such, many components and features common in traditional piloted aircraft are over-sized for these aircraft applications, such as the combustor liners commonly included in traditional aircraft engines.

For example, combustor liners of a traditional aircraft engine are relatively large compared to the requirements for limited lifetime vehicles. This can add significantly to the manufacturing build footprint. Additionally, the use of multiple and/or complex fasteners during assembly can also add time and labor to the manufacturing process. There exist needs in various industries to reduce the manufacturing footprint size and the number of manufactured parts, thereby reducing manufacturing costs.

SUMMARY

A method of manufacturing a nested combustor liner includes manufacturing a nested combustor liner into a green state including a plurality of annular interior walls radially adjacent to one another and circumferentially surrounding an exhaust duct aperture and a plurality of annular exterior walls radially adjacent to one another and radially spaced apart from and circumferentially surrounding the plurality of annular interior walls and an ignitor wall attached to a first annular interior wall at a first interior end, extending radially toward and attached to a first annular exterior wall at a first exterior end. The method includes assembling the plurality of annular interior walls and the plurality of annular exterior walls, forming an assembled combustor liner. The method includes densifying the assembled combustor liner.

A method of manufacturing a plurality of nested combustor liners simultaneously in a single build cycle and in a single build chamber of an additive manufacturing apparatus includes manufacturing a plurality of nested combustor liners into a green state in a single build cycle and in a single build chamber of an additive manufacturing apparatus. Each nested combustion liner comprises a plurality of annular interior walls radially adjacent to one another and circumferentially surrounding an exhaust duct aperture and a plurality of annular exterior walls radially adjacent to one another and radially spaced apart from and circumferentially surrounding the plurality of annular interior walls. The method includes assembling the plurality of annular interior walls and the plurality of annular exterior walls, forming a plurality of assembled combustor liners. The method includes sintering each of the plurality of assembled combustor liners to densify each of the plurality of the combustor liners.

A combustor liner includes a plurality of extended annular interior walls circumferentially surrounding an exhaust duct aperture. Each of the plurality of extended annular interior walls is radially adjacent to and axially extended from at least one other of the plurality of extended annular interior walls and a first annular interior wall includes a first interior flange extending radially away from the exhaust duct aperture and wherein a second annular interior wall has a second interior flange extending radially inward toward the first annular interior wall. The combustor liner includes a plurality of extended annular exterior walls radially spaced apart from and circumferentially surrounding the plurality of annular interior walls. Each of the plurality of extended annular exterior walls is radially adjacent to and axially extended from at least one other of the plurality of extended annular exterior walls and a first annular exterior wall includes a first exterior flange extending radially away from the first annular interior wall and wherein a second annular exterior wall has a second exterior flange extending radially inward toward the first annular exterior wall. The combustor liner includes an ignitor wall attached to a first interior wall end of the first annular interior wall and attached to a first exterior wall end of the first annular exterior wall. The combustor liner includes a first compressible seal compressed between the first annular interior wall and the second annular interior wall and between the first interior flange and the second interior flange and a second compressible seal compressed between the first annular exterior wall and the second annular exterior wall and between the first exterior flange and the second exterior flange.

DETAILED DESCRIPTION

A combustor liner with a nested build reduces the manufacturing footprint. Even so, a gas turbine engine can leverage additive manufacturing techniques to improve various aspects of the gas turbine engine such as, for example, limited-life engines. Additive manufacturing allows the assembly details to be unitized, and simultaneously permits integration of many complex performance-enhancing features. The use of additive manufacturing to produce the engine reduces the time to delivery to the customer and lowers the overall production costs of the unit.

Disclosed herein is a combustor liner with a nested build configured to be manufactured in a green state, assembled, and then sintered together. As used herein, green state means a partially manufactured part, which is sturdy enough to withstand further processing such as assembly but requires further manufacturing steps such as sintering before the part is used under operational conditions. Conventionally built combustor liners require comparatively large manufacturing footprints. Using part nesting strategies to increase manufacturing density can significantly reduce the required space needed to manufacture the combustor liner. For example, additive manufacturing part cost is directly tied to the part volume. Part nesting allows for a relatively small manufacturing footprint or multiple combustor liners to be manufactured in the same footprint as a conventionally manufactured combustor liner.

By using design for additive manufacturing (DfAM) Binder jet specific rules, multiple nested combustor liners can be manufactured simultaneously in a single build chamber of an additive manufacturing apparatus. DfAM is a general type of design method or tool whereby functional performance or other key product life-cycle considerations such as manufacturability, reliability, and cost can be optimized subjected to the capabilities of additive manufacturing technologies. Once the combustor liner sets of walls are built in the nested configuration, which can be referred to as a green state in some embodiments, the sets of walls can be partially assembled by hand by expanding the nested combustor liner sets of walls. A compressible seal is placed between each pair of adjacent walls followed by sintering the sets of walls in the expanded configuration. During the sintering process, the parent material shrinks due to the binder material burning out, bringing the seals into a compressed state, which resists further movement of the adjacent walls relative to one another.

Combustor liner 200 can be additively manufactured using techniques such as laser powder bed fusion, electron beam melting, direct energy deposition, gap photo polymerization, and binder jetting. The additive manufacturing process can use any suitable material, including without limitation metals, alloys, and ceramic based materials that can tolerate the high temperature and pressure environment of a gas turbine engine for the expected useable life of the vehicle, such as, for example, nickel based alloys like Inconel® 625. However, guided munitions, missiles, and decoys are designed as single use vehicles and can have a maximum useable life of 10 hours. Heat protection that extends the useable life of the vehicle beyond 10 hours can unnecessarily add labor and expense to the manufacturing of such an engine. On the other hand, some UAVs can be designed to perform multiple missions and more heat protection may be desirable. A specific metal or alloy with or without additional treatments to provide heat protection can be chosen with such considerations in mind. For example, a thermal barrier layer or coating can be applied to the metal or alloy to extend the useful life of the gas turbine engine.

Figure 1:
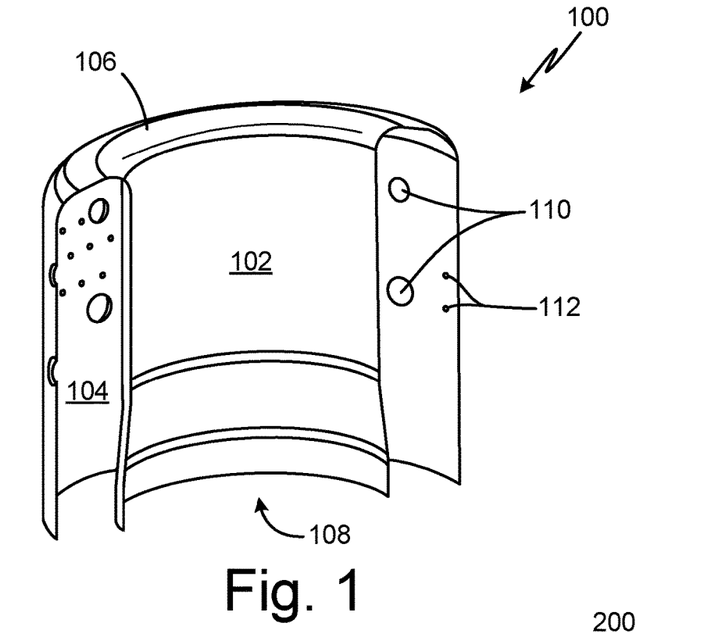
FIG. 1 is a cross-sectional view of a manufactured combustor liner.

FIG. 1 is a cross-sectional view of a manufactured combustor liner. FIG. 1 shows combustor liner 100 including annular interior wall 102, annular exterior wall 104, ignitor wall 106, exhaust duct aperture 108, dilution chutes 110, and dilution holes 112. Annular interior wall 102 of combustor liner 100 extends circumferentially around and surrounds exhaust duct aperture 108. Annular exterior wall 104 extends circumferentially around and is spaced radially apart from annular interior wall 102 and away from exhaust duct aperture 108.

Ignitor wall 106 circumferentially surrounds exhaust duct aperture 108 and extends radially. Ignitor wall 106 is attached to an axial end of annular interior wall 102 at an inner radial diameter of ignitor wall 106 and is attached to an axial end of annular exterior wall 104 at an outer radial diameter of ignitor wall 106. Exhaust duct aperture 108 is partially defined by annular interior wall 102 and is configured to house an exhaust duct. Annular interior wall 102, annular exterior wall 104, and ignitor wall 106 together can define a combustion chamber.

Annular exterior wall 104 can include dilution chutes 110 and dilution holes 112. Dilution chutes 110 can provide apertures for delivery of air and fuel to the combustion chamber. Dilution holes 112 can provide apertures for delivery of air to the combustion chamber. Dilution chutes 110 and dilution holes 112 together can provide apertures such that a desired combustion efficiency is achieved while maintaining the integrity of combustor liner 100 under load by controlling parameters such as the air to fuel ratio and the amount of cooling. For example, the size, number, and position of dilution chutes 110 and dilution holes 112 can be optimized using any technique known in the art such as predictive software to help control the amount and direction of fuel and air flow into and through the combustion chamber.

Figure 2:
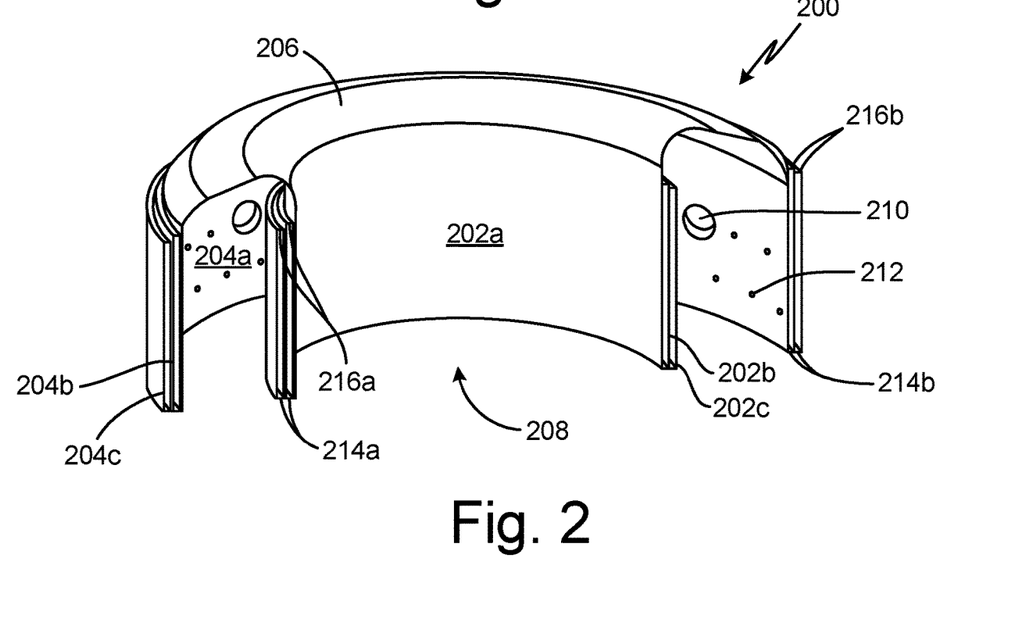
FIG. 2 is a cross-sectional view of a nested combustor liner in a green state.

FIG. 2 is a cross-sectional view of a nested combustor liner in a green state. FIG. 2 shows combustor liner 200 in a green state including annular interior walls 202a, 202b, and 202c, annular exterior walls 204a, 204b, and 204c, ignitor wall 206, exhaust duct aperture 208, dilution chutes 210, dilution holes 212, flanges 214a, 214b, 216a, and 216b.

Annular interior walls 202a, 202b, and 202c are partially manufactured into a green state and are nested. In one embodiment, as depicted in FIG. 2, first annular interior wall 202a extends circumferentially around and surrounds exhaust duct aperture 108. Second annular interior wall 202b is adjacent to, extends circumferentially around, and surrounds first annular interior wall 202a. Third annular interior wall 202c is adjacent to, extends circumferentially around, and surrounds second annular interior wall 202b.

In one embodiment, annular interior walls can be arranged inversely to those depicted in FIG. 2, that is annular interior wall 202c is first annular interior wall 202c and resides as the inner-most annular interior wall rather than the first annular interior wall 202a as depicted in FIG. 2. Specifically, first annular interior wall 202c extends circumferentially around and surrounds exhaust duct aperture 108. Second annular interior wall 202b is adjacent to, extends circumferentially around, and surrounds first annular interior wall 202c. Third annular interior wall 202a is adjacent to, extends circumferentially around, and surrounds second annular interior wall 202b.

Annular exterior walls 204a, 204b, and 204c are partially manufactured into a green state and are nested. In one embodiment, as depicted in FIG. 2, first annular exterior wall 204a extends circumferentially around and surrounds the combustion chamber. Second annular exterior wall 204b is adjacent to, extends circumferentially around, and surrounds first annular exterior wall 204a. Third annular exterior wall 204c is adjacent to, extends circumferentially around, and surrounds second annular exterior wall 204b.

In one embodiment, annular exterior walls can be arranged inversely to those depicted in FIG. 2, that is annular exterior wall 204c is first annular exterior wall 204c and resides as the inner-most annular exterior wall rather than the first annular exterior wall 204a as depicted in FIG. 2. Specifically, first annular exterior wall 204c extends circumferentially around and surrounds the combustion chamber. Second annular exterior wall 204b is adjacent to, extends circumferentially around, and surrounds first annular exterior wall 204c. Third annular exterior wall 204a is adjacent to, extends circumferentially around, and surrounds second annular exterior wall 204b.

Ignitor wall 206 circumferentially surrounds exhaust duct aperture 208 and extends radially between first annular internal wall 202a and first annular exterior wall 204a. In one embodiment, as depicted in FIG. 2, ignitor wall 206 is attached to an axial end of first annular interior wall 202a at an inner radial diameter of ignitor wall 206 and is attached to an axial end of first annular exterior wall 204a at an outer radial diameter of ignitor wall 206.

Exhaust duct aperture 208 is partially defined by annular interior walls 202a, 202b, and 202c and is configured to house an exhaust duct (not shown), which is outside the scope of the present disclosure. Annular interior walls 202a, 202b, and 202c, annular exterior walls 204a, 204b, and 204c, and ignitor wall 206 together can define a combustion chamber.

Annular exterior walls 204a, 204b, and 204c can include dilution chutes 210 and dilution holes 212. Dilution chutes 210 can provide apertures for delivery of air and fuel to the combustion chamber. Dilution holes 212 can provide apertures for delivery of air to the combustion chamber. Dilution chutes 210 and dilution holes 212 together can provide apertures such that a desired combustion efficiency is achieved under load while maintaining the integrity of combustor liner 200 by controlling parameters such as the air to fuel ratio and the amount of cooling. For example, the size, number, and position of dilution chutes 210 and dilution holes 212 can be optimized to help control the amount and direction of fuel and air flow into and through the combustion chamber.

As depicted in FIG. 2, first and second annular interior walls 202a and 202b include flanges 214a, which extend outwardly away from exhaust duct aperture 208 and are attached at an end opposite of ignitor wall 206. Second and third annular interior walls 202b and 202c include flanges 216a, which extend inwardly toward exhaust duct aperture 208 and are attached at an end adjacent to ignitor wall 206.

First and second annular exterior walls 204a and 204b include flanges 214b, which extend outwardly away from exhaust duct aperture 208 and are attached at an end opposite of ignitor wall 206. Second and third annular exterior walls 204b and 204c include flanges 216b, which extend inwardly toward exhaust duct aperture 208 and are attached at an end adjacent to ignitor wall 206.

Figure 3:
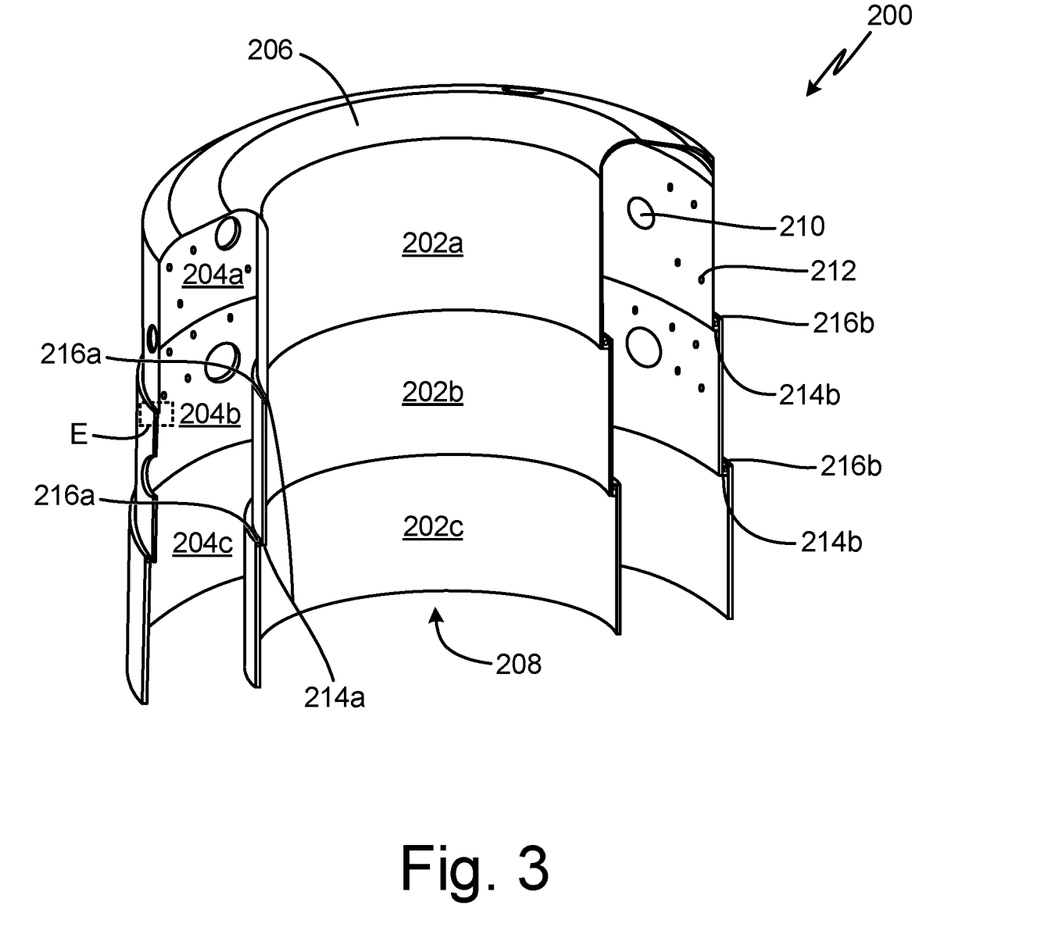
FIG. 3 is a cross-sectional view of an assembled combustor liner.

FIG. 3 is a cross-sectional view of an assembled combustor liner. FIG. 3 shows assembled combustor liner 200 including first, second, and third annular interior walls 202a, 202b, and 202c, first, second, and third annular exterior walls 204a, 204b, and 204c, ignitor wall 206, exhaust duct aperture 208, dilution chutes 210, dilution holes 212, flanges 214a, 214b, 216a, 216b, and compressible seals 218. A person of ordinary skill will understand that the assembled combustor liner 200 may have additional annular interior walls, such as fourth, fifth, and sixth (or more) annular interior walls (not shown) and additional annular exterior walls, such as fourth, fifth, and sixth (or more) annular exterior walls (not shown).

The descriptions for reference numbers in FIG. 2 that are repeated in FIG. 3 have substantially the same descriptions. However, in FIG. 3 compressible seals 218 are inserted in between flanges 214a and 216a and in between flanges 214b and 216b. First, second, and third annular interior walls 202a, 202b, and 202c are in an extended state and flanges 214a and 216a both abut compressible seal 218 from opposite sides. Similarly, first, second, and third annular exterior walls 204a, 204b, and 204c are in an extended state and flanges 214b and 216b both abut compressible seal 218 from opposite sides.

Although three sets of walls are depicted in FIGS. 2 and 3 for annular interior walls (202a, 202b, and 202c) and for annular exterior walls (204a, 204b, and 204c), in some embodiments more than three sets of walls such as fourth, fifth, and sixth (or more) sets of walls are used to manufacture nested combustor liner 200. In one embodiment, two sets of walls are used to manufacture nested combustor liner 200.

Figure 4:
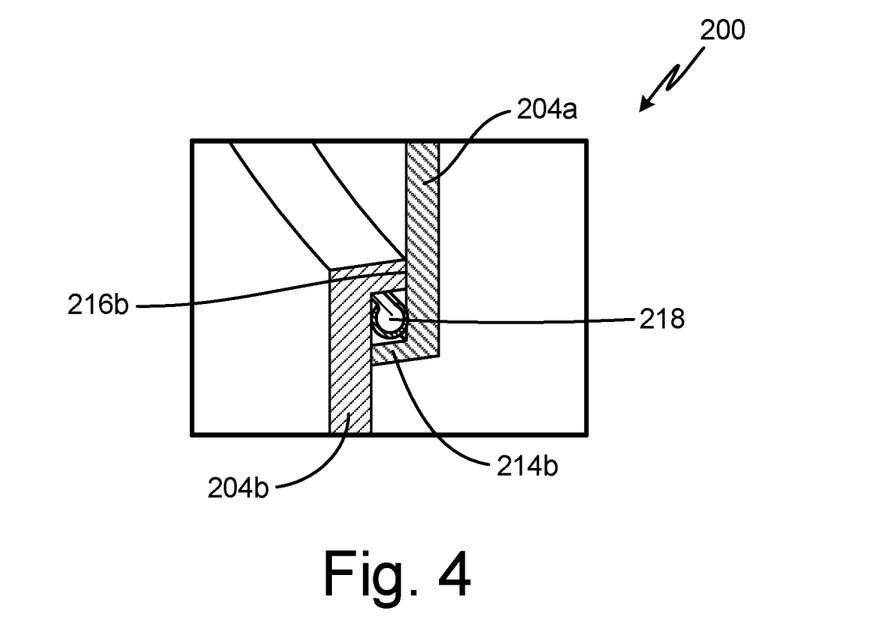
FIG. 4 is expanded sectional view E of the assembled combustor liner from FIG. 3.

FIG. 4 is expanded sectional view E of the assembled combustor liner from FIG. 3. FIG. 4 shows combustor liner 200 including first and second annular exterior walls 204a, 204b, flanges 214b, 216b, and compressible seal 218. First and second annular exterior walls 204a and 204b are in an extended state. Flange 214b of first annular exterior wall 204a extends outwardly in a radial direction away from exhaust duct aperture 208 and flange 216b of second annular exterior wall 204b extends inwardly in a radial direction toward exhaust duct aperture 208. Compressible seal 218 is positioned between first annular exterior wall 204a and second annular exterior wall 204b and between flanges 214b and 216b. In one embodiment, compressible seal 218 abuts first and second annular exterior walls 204a, 204b, and flanges 214b, 216b.

Although compressible seals 218 are depicted as C-seals in FIGS. 3 and 4, compressible seals 218 can be any compliant seal such as, for example, J-seal, S-seal, and M-seal. Compressible seals 218 can be formed of a different material than the rest of combustor liner 200 as long as the materials have similar coefficients of expansion. Compressible seals 218 can also be formed of a slurry, which can be injected between flanges 214a and 216a and in between flanges 214b and 216b. For example, a manufactured combustor liner formed of ceramic based materials can also use a compressible seal formed of ceramic based materials, which can be inserted between opposing flanges in a slurry form.

Combustor liner 200 is manufactured by forming a nested green-state build such as the embodiment show in FIG. 2. The nested green-state build is then partially assembled. For example, combustor liner 200 depicted in FIG. 2 has compressible seals 218 inserted by hand between interior walls 202a and 202b and interior walls 202b and 202c. Compressible seals 218 are also inserted between exterior walls 204a and 204b and between exterior walls 204b and 204c. Interior walls 202b and 202c and exterior walls 204b and 204c are slid by hand in an axial direction away from ignitor wall 206 until compressible seals 218 abut flanges 214a and 216a or flanges 214b and 216b such as the embodiment depicted in FIG. 3.

Assembled combustor liner 200 is then treated such that combustor liner 200 shrinks using, for example, heat treatment to densify combustor liner 200. In other words, assembled combustor liner 200 increases in density during the treatment, which in turn exerts a compressive force on compressible seals 218. As first, second, and third annular interior walls 202a, 202b, 202c, first, second, and third annular exterior walls 204a, 204b, 204c, flanges 214a, 216a, 214b, and 216b shrink, compressible seal 218 is compressed and resists any further movement of first, second, and third annular interior walls 202a, 202b, 202c, first, second, and third annular exterior walls 204a, 204b, 204c, flanges 214a, 216a, 214b, and 216b relative to one another including under operational load conditions. In one embodiment, the additive manufacturing technique of binder jetting is used, which can evaporate the binder material during a sintering process, resulting in densification of combustor liner 200.

In some embodiments, combustor liner 200 can be manufactured using material extrusion techniques or using ceramic slurries. Upon insertion of compressible seals and assembly, the assembled combustor liner 200 is then treated, such as heat treated, sintered, or cured to densify combustor liner 200, which exerts a compression force upon the compressible seals.

Figure 5:
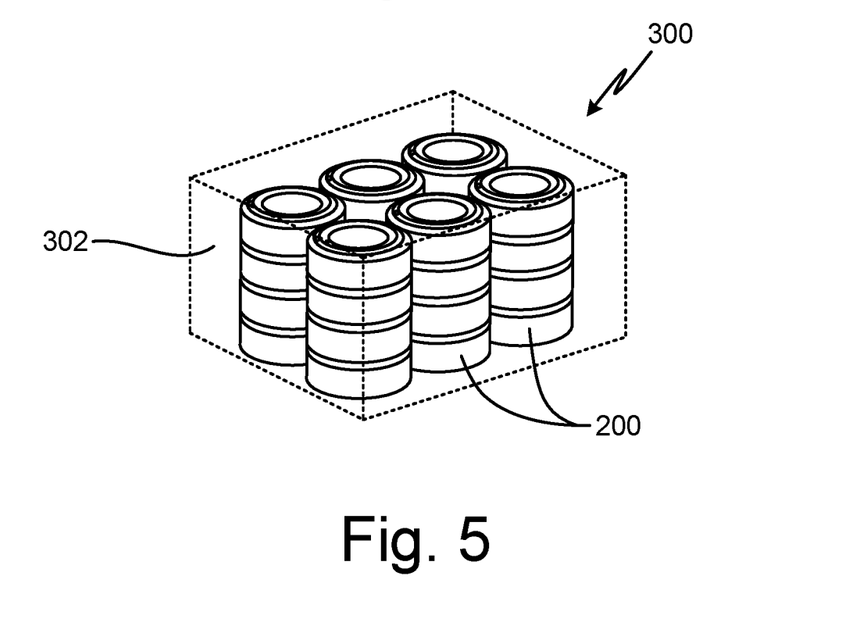
FIG. 5 is a view of a series of nested combustor liners in a green state being manufactured together.

FIG. 5 is a view of a series of nested combustor liners in a green state being manufactured together. FIG. 5 shows additive manufacturing apparatus 300 having build space 302. FIG. 5 shows nested combustor liners 200 being manufactured together in a single build cycle within build space 302 of manufacturing apparatus 300. Additive manufacturing machines have limited volumes in which the additive manufacturing machines can build structures. As depicted in FIG. 5, additive manufacturing apparatus 300 has a volume defined by build space 302. Although twenty-four nested combustor liners 200 are depicted in FIG. 5, fewer or more than twenty-four nested combustor liners 200 can be simultaneously built into a green state using additive manufacturing apparatus 300 in a single build cycle. Parameters such as the volume of build space 302, the size and shape of nested combustor liners 200, and the location and orientation of each combustor liner 200 within build space 302 can be optimized to maximize the number of combustor liners built at one time in a single build cycle. Significant time is saved by manufacturing multiple nested combustor liners 200 simultaneously in a single build cycle compared to manufacturing one nested combustor liner or one expanded combustor liner at a time.

A combustor liner with a nested build configured to be manufactured in a green state, assembled, and then sintered together saves significant manufacturing time and space compared to a conventionally built combustor liner. Conventionally built combustor liners require comparatively large manufacturing footprints. Using part nesting strategies to increase manufacturing density can significantly reduce the required space needed to manufacture the combustor liner. For example, additive manufacturing part cost is directly tied to the part volume. Furthermore, by using DfAM Binder jet specific rules, multiple nested combustor liners can be manufactured simultaneously in a single build chamber of an additive manufacturing apparatus during a single build cycle.

DISCUSSION OF POSSIBLE EMBODIMENTS

The following are non-exclusive descriptions of possible embodiments of the present invention.

A method of manufacturing a nested combustor liner includes manufacturing a nested combustor liner into a green state including a plurality of annular interior walls radially adjacent to one another and circumferentially surrounding an exhaust duct aperture and a plurality of annular exterior walls radially adjacent to one another and radially spaced apart from and circumferentially surrounding the plurality of annular interior walls and an ignitor wall attached to a first annular interior wall at a first interior end, extending radially toward and attached to a first annular exterior wall at a first exterior end. The method includes assembling the plurality of annular interior walls and the plurality of annular exterior walls, forming an assembled combustor liner. The method includes densifying the assembled combustor liner.

The method of the preceding paragraph can optionally include, additionally and/or alternatively, any one or more of the following features, configurations and/or additional components:

Densifying the assembled combustor liner is done by sintering the assembled combustor liner.

The first annular interior wall includes a first interior flange extending radially away from the exhaust duct aperture and attached to a second interior end opposite the first interior end and the first exterior wall includes a first annular exterior flange extending radially away from the first interior wall and attached to a second exterior end opposite the first exterior end.

A second annular interior wall has a second interior flange extending radially inward toward the first annular interior wall and attached to an end adjacent to the ignitor wall and a second annular exterior wall has a second exterior flange extending radially inward toward the first annular exterior wall and attached to an end adjacent the ignitor wall.

The method includes inserting a compressible seal between the first annular interior wall and the second annular interior wall and inserting a compressible seal between the first annular exterior wall and the second annular exterior wall.

The compressible seal is a C seal.

The method includes axially extending the plurality of annular interior and exterior walls away from the first annular interior wall and the first annular exterior wall, respectively.

Densifying the assembled combustor liner results in compression of the compressible seal to resist movement of the plurality of annular interior walls relative to one another and movement of the plurality of annular exterior walls relative to one another.

The nested combustor liner includes nickel or a nickel based alloy.

Manufacturing a nested combustor liner is performed using additive manufacturing techniques.

Additive manufacturing techniques is binder jet printing.

A method of manufacturing a plurality of nested combustor liners simultaneously in a single build cycle and in a single build chamber of an additive manufacturing apparatus includes manufacturing a plurality of nested combustor liners into a green state in a single build cycle and in a single build chamber of an additive manufacturing apparatus. Each nested combustion liner comprises a plurality of annular interior walls radially adjacent to one another and circumferentially surrounding an exhaust duct aperture and a plurality of annular exterior walls radially adjacent to one another and radially spaced apart from and circumferentially surrounding the plurality of annular interior walls. The method includes assembling the plurality of annular interior walls and the plurality of annular exterior walls, forming a plurality of assembled combustor liners. The method includes sintering each of the plurality of assembled combustor liners to densify each of the plurality of the combustor liners.

The method of the preceding paragraph can optionally include, additionally and/or alternatively, any one or more of the following features, configurations and/or additional components:

The first annular interior wall includes a first interior flange extending radially away from the exhaust duct aperture and attached to a second interior end opposite the first interior end and the first exterior wall includes a first annular exterior flange extending radially away from the first interior wall and attached to a second exterior end opposite the first exterior end.

A second annular interior wall has a second interior flange extending radially inward toward the first annular interior wall and attached to an end adjacent to the ignitor wall and a second annular exterior wall has a second exterior flange extending radially inward toward the first annular exterior wall and attached to an end adjacent the ignitor wall.

The method includes inserting a compressible seal between the first annular interior wall and the second annular interior wall and inserting a compressible seal between the first annular exterior wall and the second annular exterior wall.

The method includes axially extending the plurality of annular interior and exterior walls away from the first annular interior wall and the first annular exterior wall, respectively.

Sintering each of the plurality of assembled combustor liners results in compression of the compressible seals to resist movement of the plurality of annular interior walls relative to one another and movement of the plurality of annular exterior walls relative to one another.

A combustor liner includes a plurality of extended annular interior walls circumferentially surrounding an exhaust duct aperture. Each of the plurality of extended annular interior walls is radially adjacent to and axially extended from at least one other of the plurality of extended annular interior walls and a first annular interior wall includes a first interior flange extending radially away from the exhaust duct aperture and wherein a second annular interior wall has a second interior flange extending radially inward toward the first annular interior wall. The combustor liner includes a plurality of extended annular exterior walls radially spaced apart from and circumferentially surrounding the plurality of annular interior walls. Each of the plurality of extended annular exterior walls is radially adjacent to and axially extended from at least one other of the plurality of extended annular exterior walls and a first annular exterior wall includes a first exterior flange extending radially away from the first annular interior wall and wherein a second annular exterior wall has a second exterior flange extending radially inward toward the first annular exterior wall. The combustor liner includes an ignitor wall attached to a first interior wall end of the first annular interior wall and attached to a first exterior wall end of the first annular exterior wall. The combustor liner includes a first compressible seal compressed between the first annular interior wall and the second annular interior wall and between the first interior flange and the second interior flange and a second compressible seal compressed between the first annular exterior wall and the second annular exterior wall and between the first exterior flange and the second exterior flange.

The combustor liner of the preceding paragraph can optionally include, additionally and/or alternatively, any one or more of the following features, configurations and/or additional components:

The plurality of extended annular interior walls, the plurality of extended annular exterior walls, and the ignitor wall include nickel or a nickel-based alloy.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method, comprising: manufacturing a nested combustor liner into a green state, the nested combustion liner extending circumferentially around an axis and comprising:
   a plurality of annular interior walls radially adjacent to one another and circumferentially surrounding an exhaust duct aperture, the plurality of annular interior walls including a first annular interior wall, a second annular interior wall, and a third annular interior wall, the first annular interior wall in an interior wall nested position, and the third annular interior wall is positioned radially outward of, extends circumferentially about and axially overlaps the second annular interior wall and the first annular interior wall during the manufacturing;
   a plurality of annular exterior walls radially adjacent to one another and radially spaced apart from and circumferentially surrounding the plurality of annular interior walls, the plurality of annular exterior walls including a first annular exterior wall, a second annular exterior wall, and a third annular exterior wall, the first annular exterior wall in an exterior wall nested position and the third annular exterior wall circumscribes and axially overlaps the second annular exterior wall and the first annular exterior wall during the manufacturing;
   an ignitor wall attached to the first annular interior wall at a first interior end, extending radially toward and attached to the first annular exterior wall at a first exterior end;
   assembling the plurality of annular interior walls and the plurality of annular exterior walls to form an assembled combustor liner, the assembling comprising
   moving the second annular interior wall along the axis relative to the first annular interior wall from the interior wall nested position to an interior wall extended position in a direction away from the ignitor wall;
   moving the second annular exterior wall along the axis relative to the first annular exterior wall from the exterior wall nested position to an exterior wall extended position in the direction away from the ignitor wall;
   moving the third annular interior wall along the axis relative to the second annular interior wall from a second interior wall nested position to a second interior wall extended position in the direction away from the ignitor wall and the second annular interior wall;
   moving the third annular exterior wall along the axis relative to the second annular exterior wall from a second exterior wall nested position to a second exterior wall extended position in the direction away from the ignitor wall and the second annular exterior wall; and
densifying the assembled combustor liner.

2. The method of claim 1, wherein densifying the assembled combustor liner is done by sintering the assembled combustor liner.

3. The method of claim 2, wherein
the first annular interior wall includes a first interior flange extending radially away from the exhaust duct aperture and attached to a second interior end opposite the first interior end; and
the first annular exterior wall includes a first annular exterior flange extending radially away from the first annular interior wall and attached to a second exterior end opposite the first exterior end.

4. The method of claim 3, wherein
the second annular interior wall has a second interior flange extending radially inward toward the first annular interior wall and attached to an end adjacent to the ignitor wall; and the second annular exterior wall has a second exterior flange extending radially inward toward the first annular exterior wall and attached to an end adjacent the ignitor wall.

5. The method of claim 4, further comprising:
inserting a compressible seal between the first annular interior wall and the second annular interior wall; and
inserting a compressible seal between the first annular exterior wall and the second annular exterior wall.

6. The method of claim 5, wherein the compressible seal is a C seal.

7. The method of claim 5, wherein densifying the assembled combustor liner results in compression of the compressible seal to resist movement of the plurality of annular interior walls relative to one another and movement of the plurality of annular exterior walls relative to one another.

8. The method of claim 1, wherein the nested combustor liner includes nickel or a nickel based alloy.

9. The method of claim 1, wherein manufacturing the nested combustor liner is performed using additive manufacturing techniques.

10. The method of claim 9, wherein using additive manufacturing techniques is binder jet printing.

11. A method, comprising:
manufacturing a nested combustor liner into a green state, the nested combustion liner comprising:
a plurality of annular interior walls including a first interior wall, a second interior wall and a third interior wall, the second interior wall positioned radially outward of, extending circumferentially about and axially overlapping the first interior wall, and the third interior wall positioned radially outward of, extending circumferentially about and axially overlapping the first interior wall and the second interior wall;
a plurality of annular exterior walls radially outboard of the plurality of annular interior walls, the plurality of annular exterior walls including a first exterior wall, a second exterior wall and a third exterior wall, the second exterior wall being positioned radially outward of, extending circumferentially about, and axially overlapping the first exterior wall, and the third exterior wall being positioned radially outward of, extending circumferentially about, and axially overlapping the first exterior wall and the second exterior wall;
an ignitor wall attached to and extending radially between the first interior wall the first exterior wall;
assembling the plurality of annular interior walls and the plurality of annular exterior walls to form an assembled combustor liner, the assembling comprising the steps of
moving the second interior wall along the first interior wall to a second interior wall extended position downstream the first interior wall and in a direction of combustor flow, and moving the third interior wall along the second interior wall to a third interior wall extended position downstream the second interior wall;
moving the second exterior wall along the first exterior wall to a second exterior wall extended position downstream the first exterior wall and in the direction of combustor flow, and moving the third exterior wall along the second exterior wall to a third exterior wall extended position downstream the second exterior wall; and
densifying the assembled combustor liner.

12. The method of claim 11, wherein
the second interior wall is axially between the first interior wall and the third interior wall when in the assembled combustor liner; and
the second exterior wall is axially between the first exterior wall and the third exterior wall when in the assembled combustor liner.

\* \* \* \* \*